Patented Jan. 5, 1954

2,665,301

UNITED STATES PATENT OFFICE 2,665,301

ARYL ESTERS OF CHLOROBENZOIC ACID

Ezra Monroe, Midland, and Clare Hand, Sanford, Mich., assignors to The Dow Chemical Company, Midland, Mich., a corporation of Delaware No Drawing. Application April 13, 1949, Serial No. 87,352

4 Claims. (Cl. 260—476)

This invention is concerned with the aryl esters of chlorobenzoic acid having the formula:

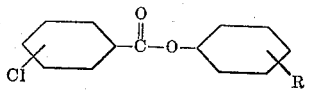

wherein R represents the lower alkyl radicals containing from 1 to 4 carbon atoms. These new compounds are oils or crystalline solids somewhat soluble in many organic solvents, substantially insoluble in water, stable to light and air, and non-corrosive to the skin of man and higher animals. They are valuable as intermediates for the preparation of more complex organic derivatives and as parasiticidal toxicants.

These ester products may be prepared by various methods. A preferred procedure for preparing the compounds comprises reacting at a temperature of from 0° to 35° C., an alkali metal salt of a suitable substituted phenol with chlorobenzoyl chloride. Good yields are obtained when substantially equimolecular proportions of the reactants are employed.

In practice, the reaction is carried out in water as reaction solvent. The phenolate employed is preferably the sodium salt and may be prepared by reacting substantially equimolecular proportions of sodium hydroxide and the desired phenol in water. The chlorobenzoylchloride is then added portionwise to the above mixture with stirring and at a temperature of from 0° to 30° C. Following the reaction, the desired ester product may be separated by conventional methods, such as decantation, filtering, washing with water, fractional distillation and fractional crystallization.

*Example 1.—p-Methylphenyl ester of p-chlorobenzoic acid*

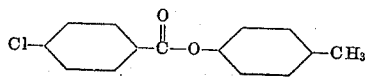

77 grams (1.925 moles) of sodium hydroxide and 216 grams (2.0 moles) of p-methylphenol were dissolved in 349 milliliters of water to prepare an aqueous phenolate solution. 350 grams (2.0 moles) of p-chlorobenzoylchloride was added portionwise to the above mixture with stirring. The addition was carried out at a temperature of 35° C. Following the reaction, the crude reaction product was washed with water, and the resulting mixture filtered to obtain the p-methylphenyl ester of p-chlorobenzoic acid as a crystalline residue. This product was recrystallized from ethanol and found to melt at 97° C.

*Example 2.—m-Methylphenyl ester of p-chlorobenzoic acid*

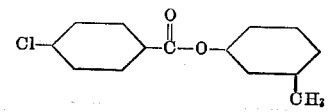

200 grams (5.0 moles) of sodium hydroxide and 540 grams (5.0 moles) of m-methylphenol were dissolved in 1906 milliliters of water to prepare an aqueous solution of the phenolate. 875 grams (5.0 moles) of p-chlorobenzoylchloride was added portionwise to the above mixture with stirring. The addition was carried out at a temperature of from 10° to 12° C. Following the reaction, the mixture was successively washed with water and petroleum ether, and filtered to obtain the m-methylphenyl ester of p-chlorobenzoic acid as a crystalline residue. This product was recrystallized from ethanol and found to melt at 96° to 97.5° C.

*Example 3.—m-Methylphenyl ester of o-chlorobenzoic acid*

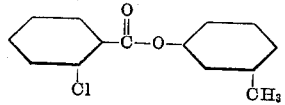

60 grams (1.5 moles) of sodium hydroxide and 162 grams (1.5 moles) of m-methylphenol were dissolved in 272 milliliters of water. 262.5 grams (1.5 moles) of o-chlorobenzoylchloride was added portionwise to the above mixture at a temperature of 15° C. Following the reaction, the crude product was extracted with benzene and the extract washed with water, dried with anhydrous sodium sulphate and fractionally distilled under reduced pressure to obtain the m-methylphenyl ester of o-chlorobenzoic acid as an oily liquid. The latter had a boiling point of 194° C. at 11 millimeters pressure, a specific gravity of 1.2199 at 25° C., and a refractive index $n/D$ of 1.5760 at 25° C. A portion of this product was dispersed in water to produce a spray composition. The proportions of the constituents were 1 pound of toxicant, 0.125 pound of the dioctyl ester of sodium sulfosuccinic acid (Aerosol OT) and 0.125 pound of refined kerosene per 100 gallons of solution. When employed for the control of two-spotted spider mite such composition gave a control of 79 per cent.

Example 4.—m-Methylphenyl ester of m-chlorobenzoic acid

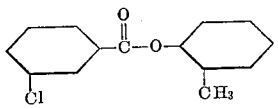

69 grams (1.72 moles) of sodium hydroxide and 185 grams (1.71 moles) of m-methylphenol were dissolved in 658 milliliters of water and 300 grams (1.71 moles) of m-chlorobenzoylchloride added portionwise thereto with stirring. The addition was carried out at a temperature of from 5° to 12° C. Following the reaction, the mixture was treated as described in Example 3 to obtain the m-methylphenyl ester of m-chlorobenzoic acid as a crystalline solid melting at 43° to 45° C. A portion of this product was dispersed in water in the proportion of 1 pound of toxicant, 0.2 pound of the dioctyl ester of sodium sulfosuccinic acid (Aerosol OT) and 2.6 pounds of xylene per 100 gallons of solution. When employed for the control of two-spotted spider mite, such composition gave a control of 94 per cent.

Example 5.—o-Methylphenyl ester of o-chlorobenzoic acid

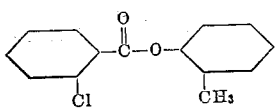

81.5 grams (2.04 moles) of sodium hydroxide and 216 grams (2.0 moles) of o-methylphenol were dissolved in 800 milliliters of water and 350 grams (2.0 moles) of o-chlorobenzoylchloride added portionwise thereto. The addition was carried out at a temperature of from 5 to 10° C. Following the reaction, the crude product was diluted with benzene, and the resulting mixture washed with water and fractionally distilled under reduced pressure to obtain the o-methylphenyl ester of o-chlorobenzoic acid as an oily liquid having a boiling point of 162° C. at 2.3 millimeters pressure, a refractive index $n/D$ of 1.5775 at 25° C., and a specific gravity of 1.2190 at 25° C. A portion of this product was dispersed in water in the proportion of 3 pounds of toxicant, 0.5 pound of Aerosol OT and 1.5 pounds of refined kerosene per 100 gallons of solution. When employed for the control of two-spotted spider mite, such composition gave a control of 98 per cent.

Example 6.—o-Secondary butylphenyl ester of p-chlorobenzoic acid

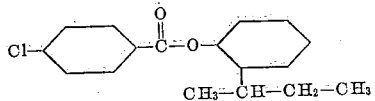

In a similar manner, 80 grams (2 moles) of sodium hydroxide and 300.4 grams (2.0 moles) of o-secondary butylphenol were dissolved in 800 milliliters of water and the resulting phenolate reacted with 350 grams (2.0 moles) of p-chlorobenzoylchloride at a temperature of from 3° to 10° C. Following the reaction, the crude product was washed with water, diluted with chlorobenzene, dried with anhydrous sodium sulphate, and fractionally distilled under reduced pressure to obtain the o-secondary butylphenyl ester of p-chlorobenzoic acid as an oily liquid. The latter had a boiling point of 173° C. at 2.7 millimeters pressure, a specific gravity of 1.2404 at 25° C., and a refractive index $n/D$ of 1.5607 at 25° C. A portion of this product was dispersed in water to produce a spray composition containing 0.5 pound of toxicant, 0.083 pound of Aerosol OT and 0.25 pound of refined kerosene per 100 gallons of solution. When employed for the control of two-spotted spider mite, such composition gave a control of 100 per cent.

Example 7.—p-Secondary butylphenyl ester of p-chlorobenzoic acid

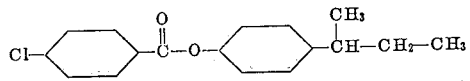

700 grams (4.0 moles) of p-chlorobenzoylchloride was reacted at a temperature of 30° C. with 168 grams (4.2 moles) of sodium hydroxide and 600 grams (4.0 moles) of p-secondary butylphenol dissolved in 765 milliliters of water. Following the reaction, the crude product was washed with water and filtered to obtain the p-secondary butylphenyl ester of p-chlorobenzoic acid as a crystalline residue. The latter was recrystallized from ethanol and found to melt at 51° to 53° C.

We claim:

1. An aryl ester of a chlorobenzoic acid having the formula:

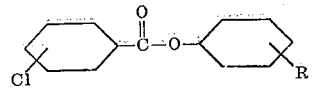

wherein R represents the lower alkyl radicals containing from 1 to 4 carbon atoms, inclusive.

2. o-Secondary butylphenyl ester of p-chlorobenzoic acid.

3. p-Secondary butylphenyl ester of p-chlorobenzoic acid.

4. o-Methylphenyl ester of o-chlorobenzoic acid.

EZRA MONROE.
CLARE HAND.

References Cited in the file of this patent

UNITED STATES PATENTS

| Number | Name | Date |
|---|---|---|
| 2,211,467 | Kimball et al. | Aug. 13, 1940 |
| 2,211,468 | Marsh | Aug. 13, 1940 |
| 2,397,802 | Mueller | Apr. 2, 1946 |
| 2,430,586 | Ruthruff et al. | Nov. 11, 1947 |
| 2,437,427 | Hester et al. | Mar. 9, 1948 |
| 2,500,902 | Monroe et al. | Mar. 14, 1950 |

OTHER REFERENCES

Huston et al., J. A. C. S., vol. 59, pp. 2001–2003 (1937).

Kirchenbach et al., Berichte, vol. 69B, pp. 723–729 (1936).